United States Patent
Bacher et al.

(10) Patent No.: US 6,513,616 B2
(45) Date of Patent: Feb. 4, 2003

(54) OCCUPANT-RESTRAINING SYSTEM

(75) Inventors: Werner Bacher, Sindelfingen (DE); Harald Rudolf, Tuebingen (DE); Frank Zerrweck, Altdorf (DE)

(73) Assignee: DaimlerChrysler AG, Stuttgart (DE)

( * ) Notice: Subject to any disclaimer, the term of this patent is extended or adjusted under 35 U.S.C. 154(b) by 53 days.

(21) Appl. No.: 09/855,846

(22) Filed: May 16, 2001

(65) Prior Publication Data

US 2002/0008372 A1 Jan. 24, 2002

(30) Foreign Application Priority Data

May 16, 2000 (EP) .......................... 00110423

(51) Int. Cl.$^7$ .......................... B60R 21/32; B60R 22/28
(52) U.S. Cl. .......................... 180/268; 180/282; 280/735; 280/806; 280/805
(58) Field of Search .......................... 180/271, 268, 180/273, 274, 282; 280/735, 806, 805

(56) References Cited

U.S. PATENT DOCUMENTS

| | | | |
|---|---|---|---|
| 3,918,545 A | * 11/1975 | Andres et al. | 180/268 |
| 5,202,831 A | * 4/1993 | Blackburn et al. | 180/282 |
| 5,398,185 A | * 3/1995 | Omura | 180/268 |
| 5,413,378 A | 5/1995 | Steffens, Jr. | 280/735 |
| 5,531,479 A | * 7/1996 | Bauer | 280/805 |
| 5,540,461 A | * 7/1996 | Nitschke et al. | 280/735 |
| 5,544,918 A | * 8/1996 | Fleming et al. | 188/377 |
| 5,558,370 A | * 9/1996 | Behr | 242/374 |
| 5,667,246 A | 9/1997 | Miller, III | 280/806 |
| 5,718,451 A | * 2/1998 | White | 180/268 |
| 5,765,774 A | * 6/1998 | Maekawa et al. | 180/268 |
| 5,788,281 A | * 8/1998 | Yanagi et al. | 180/282 |
| 5,799,893 A | * 9/1998 | Miller et al. | 242/379.1 |
| 5,900,677 A | * 5/1999 | Musiol et al. | 180/208 |
| 6,019,392 A | * 2/2000 | Karlow | 242/381 |
| 6,106,013 A | * 8/2000 | Doty et al. | 242/379.1 |
| 6,213,510 B1 | * 4/2001 | Suyama | 280/805 |
| 6,241,280 B1 | * 6/2001 | Biewendt et al. | 180/268 |
| 6,290,159 B1 | * 9/2001 | Specht et al. | 242/379.1 |
| 6,341,252 B1 | * 1/2002 | Foo et al. | 180/268 |

FOREIGN PATENT DOCUMENTS

| | | |
|---|---|---|
| DE | 43 31 027 C2 | 9/1993 |
| DE | 195 20 721 A1 | 6/1995 |
| DE | 196 04 483 C1 | 2/1996 |
| EP | 0 734 922 A1 | 10/1996 |
| EP | 0 893 313 A2 | 7/1998 |
| GB | 2 326 851 A * | 1/1999 |
| WO | WO 99/29541 A1 * | 6/1999 |

\* cited by examiner

*Primary Examiner*—Paul N. Dickson
*Assistant Examiner*—Ruth Ilan
(74) *Attorney, Agent, or Firm*—Crowell & Moring LLP

(57) ABSTRACT

An occupant-restraining system has a belt force limiter that limits a restraining force exerted on an occupant via a restraining belt by switching from a relatively higher to a relatively lower level of restraining force depending on predefined parameters. The belt-force limiter is activated only after a predetermined forward displacement of the occupant is reached and only after a predefined air bag inflating time, when an excessive crash intensity and an occupant's weight are recognized as being below a predetermined threshold.

13 Claims, 2 Drawing Sheets

OCCUPANT-RESTRAINING SYSTEM

BACKGROUND AND SUMMARY OF THE INVENTION

This application claims the priority of European patent document 00110423.1, filed May 16, 2000, the disclosure of which is expressly incorporated by reference herein.

The invention relates to an occupant-restraining system which limits the restraining force exerted on an occupant via a restraining belt.

Safety restraining systems are found today on most seats in motor vehicles. When the vehicle is involved in an accident, they are used to keep the injuries to the occupants as slight as possible. Use is made these days, inter alia, of active systems, such as, in particular, seat belts and what are referred to as "air bags".

An air bag generally known in practice is a gas sack which can be inflated automatically in the event of an accident, and which, when not in use, is folded in an accommodating space, for example below the windshield, laterally in the seat, in the door, or else in the footwell of the vehicle. At a critical driving state, the gas sack is inflated so that it emerges from this accommodating space. Inflation takes place within a short period, by means of a sensor-controlled gas generator, with the result that a balloon-like protective cushion is formed to protect the occupant.

In addition, seat belts have long been used in motor vehicles to protect the occupants. Many different types of seat belts are therefore also known. Thus, many vehicles are, for example, equipped with belts which are commercially available and are arranged at either two or three fastening points in the vehicle. They are intended to prevent the force of inertia due to a sudden, sharp braking or impact of the vehicle against an obstacle from causing the bodies of the people in the vehicle to be flung forward.

If a vehicle collides against an obstacle, in particular at high speed, the force of inertia causes the occupants to be hurled forward. If safety devices are not present, accidents of this type generally end with the people in the vehicle having severe and sometimes fatal injuries. If, in contrast, the vehicles are equipped, inter alia, with seat belts, although the occupants generally have prospects of surviving, the restraining force applied by the belt is, under some circumstances, very high for the occupants.

A method for limiting the restraining force exerted on the occupant via a belt in an occupant-restraining system is described, for example, in European Patent Document EP 0 734 922. In this case, the restraining system has a seat belt and inflatable restraining element. The restraining force exerted on the occupant by the belt is limited by a force limiter to a level which can be set, and can be adjusted to the body size or the weight of the vehicle occupant. The level of force is set here in such a manner that in the characteristic curve depicting the force over the path of forward displacement within a section after the transition of which the contact between the belt band and inflated restraining element is anticipated, the characteristic curve has a tapering-away tendency. The force limiter itself is designed in such a manner that the restraining force is limited by plastic deformation of material and the severity of the deformation of the material is variable, depending on parameters which are representative of the body size or the weight of the occupant.

This technique for limiting force, however, has proven disadvantageous in that the severity of the accident does not have any effect on the limitation of force; therefore in all types of accidents, irrespective of their severity, the restraining force exerted on the occupant is limited, which is not always desirable.

German patent document DE 196 04 483 C1 discloses a safety device for motor vehicles, in which a control device connected to measuring sensors is provided for controlling the restraining characteristics of the safety device, which has a seat belt, for the occupant in the vehicle within the bounds of the range of human endurance. The safety device is intended to be set up for the best possible restraining characteristic. For this purpose, the control device is coupled to a blocking device for the belt band (which blocking device has a force-limiting device permitting a limited extension of the belt band), in such manner that the force profile originating from the force-limiting device and/or the amount of permissible extension of the belt band (up to complete blocking of the extension of the belt) is monitored, controlled and limited as a function of the occupant's body data detected by the control device, the seat-position data relating to the passenger cell and/or the data concerned with the accident conditions.

This safety device, has the disadvantage that the influence of other safety restraining devices in the vehicle is not taken into consideration. Also, no consideration is given to the effect of the variables concerned with occupant position, body data of the occupant and data concerned with the accident conditions have on the level of force or on the limitation of force.

One structural implementation of a force limiter is described in German patent document DE 43 31 027 C2, in which a self-locking seat-belt retractor has a blocking arrangement that can be activated in a vehicle-sensitive and/or belt-band-sensitive manner. A tensioning arrangement which acts on the belt-winding-up shaft and is provided with a drive arrangement, in which the belt retractor is provided with a force-limiting device for a limited extension of the belt band. The intention is to ensure that during normal operation of the seat-belt retractor, the force-limiting device is not subject to any stress. For this purpose, it is provided that the force-limiting device can be switched on and off via an interconnected coupling as a function of the functional states of the belt retractor and/or of the tensioning arrangement.

Even in this belt-force limiter no criteria are specified for the type of limiting of the belt force. In addition, other occupant-restraining devices likewise have no effect on the level of force exerted in the case of this belt-force limiter.

One object of the present invention is to provide an occupant-restraining system which limits the restraining force exerted on an occupant via a belt, and further reduces to a minimum the loads on the occupant in the event of an accident, while at the same time also of setting the restraining force to a required extent.

This and other objects and advantages are achieved by the occupant restraining system according to the invention in which the force exerted on occupants via a restraining belt can be switched (depending on an inflating time of an air bag, the occupant's weight, a crash level and a forward displacement of the occupant) from a relatively higher to a relatively lower level of restraining force, when a belt-force limiter is activated.

Because the belt-force limiter is activated only after a predetermined forward displacement of the occupant, limitation of the belt force is activated only when a relatively great forward displacement of the occupant has actually taken place.

Because the belt-force limiter is also activated only after an inflation time of the air bag, it is thus possible, in an early accident phase, for the occupant to be coupled to the vehicle with great belt-restraining force, while at a later time in the sequence of movement, the air bag (which has been filled in the meantime) shares this task. However, it is necessary for this purpose that the occupant has anyway reached a predetermined forward displacement, and that the air bag is also completely inflated. As a result, an excessive increase of forces on the occupant can be avoided.

Furthermore, it is important that the belt-force limiter is not activated if the accident or crash intensity is too severe and/or if the occupant's weight is too great. In such a case, the belt also has to take on the restraining function, since optimum securing of the occupant cannot otherwise be ensured. That is, the occupant must always to be held back, despite having already been displaced forward and despite the air bag having been triggered on account of the great weight and/or severity of the accident.

In this case, it would even be conceivable that in the case of a very severe accident and/or a very great occupant's weight the restraining force is not only not limited, but under some circumstances is even increased.

In order, therefore, to avoid an excessive increase of forces in the case of an accident, the belt force is switched back when the weight of the occupant and/or the severity of the accident are not too great, and such switching back is not disadvantageous. In this manner, excessive increases of forces on the occupant can be avoided, so that less severe accidents, in particular, result in fewer undesirable adverse effects for the occupant.

It should be taken into consideration that the term accident or crash is not always to be understood here as meaning that the vehicle is actually involved in an accident; rather, the term "accident" is also to be understood as all other critical driving states, such as, for example, even very severe braking or skidding.

Other objects, advantages and novel features of the present invention will become apparent from the following detailed description of the invention when considered in conjunction with the accompanying drawings.

DETAILED DESCRIPTION OF THE DRAWINGS

Figure 1:
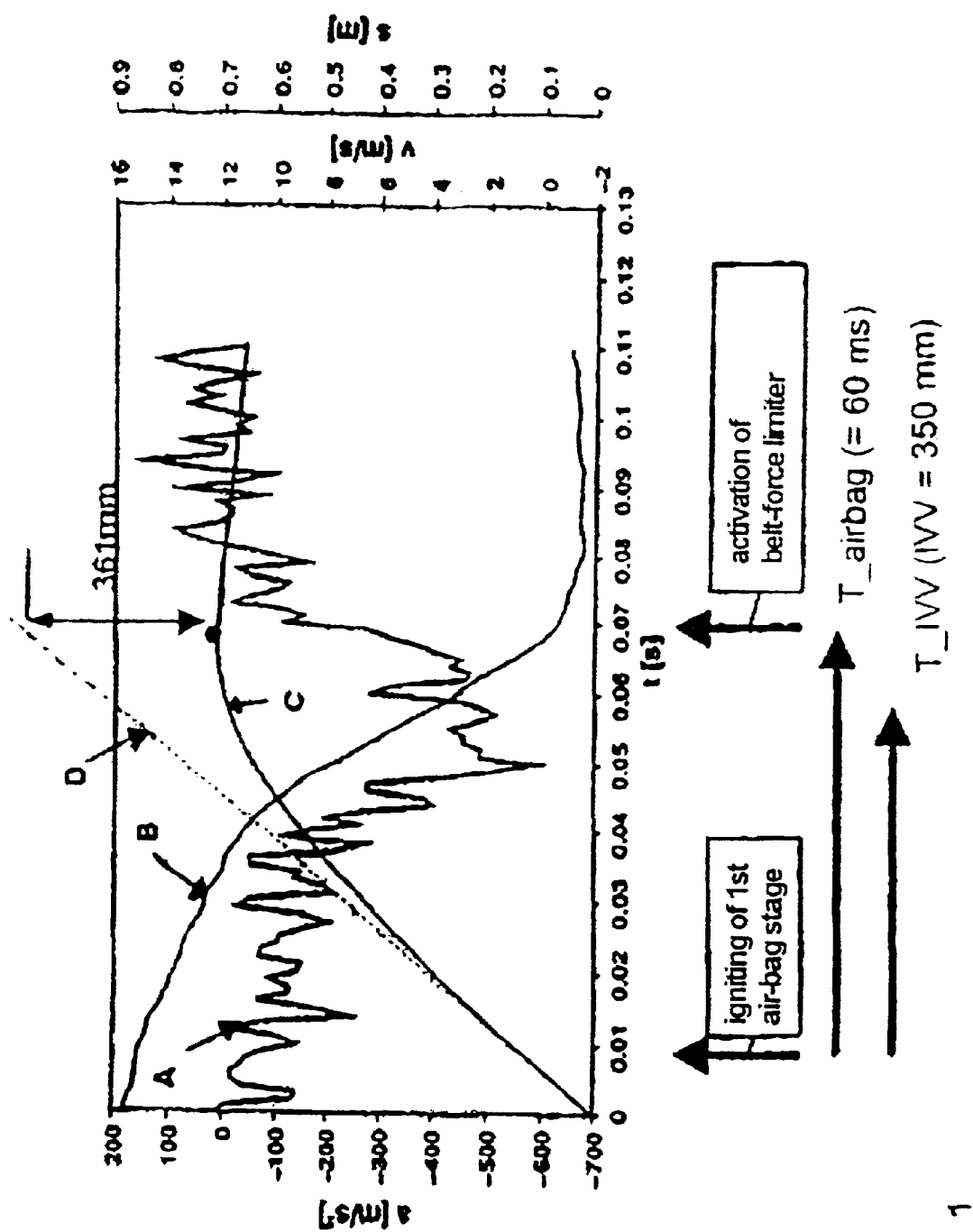
FIG. 1 shows, in a shared diagram, the different variables used in an occupant-restraining system according to the invention and in accordance with a preferred embodiment.

In the diagram of FIG. 1, an irregular curve A represents the details of an accident (in more precise terms, the acceleration a of a vehicle in an accident over the time t), while a curve B represents the first integration of the curve A over the time t, i.e., $\int a(t)\, dt$. (That is, the curve B represents the speed v and, in the present case, the decrease of the speed v of the vehicle involved in the accident over the time t.) A third curve C corresponds to a second integration of the curve A, i.e., $\int\int a(t)\, dt$, representing the path s covered by the vehicle involved in the accident again over the time t, and a straight dashed line D represents the path s of the free-flying mass over the time t (and therefore the path s of the occupant himself in the vehicle involved in the accident).

In the case of an occupant-restraining system according to the invention, a belt-force limiter is activated as a function of triggering of an air bag, an occupant's weight, the severity of the accident and a forward displacement of the occupant, with the belt-force limiter being activated only after a predetermined forward displacement of the occupant is reached and only after an inflating time of the air bag. However, the belt-force limiter is not to be activated if the crash intensity is too severe and/or the occupant's weight too great.

The forward displacement of the occupant IVV, (i.e., the relative movement of the occupant with respect to the vehicle in the event of an accident), corresponds in FIG. 1 to the difference between curve D, which represents the path of the occupant himself, and curve C, which represents the path of the vehicle in which the occupant is seated.

According to the present invention, the belt-force limiter is activated after a predetermined forward displacement of the occupant is exceeded. In the case of the occupant-restraining system described, it has proven particularly advantageous if the predetermined forward displacement of the occupant IVV is selected such that it lies in the range of from 250 mm to 400 mm. After such a forward displacement, the occupant comes into the vicinity of the inflated air bag, which can then also assist in holding him or her back.

For example, according to FIG. 1 a predetermined forward displacement of the occupant of 350 mm has been selected. An arrow T_IVV in FIG. 1 represents the time t at which the predetermined forward displacement of the occupant IVV has reached the predetermined value of 350 mm.

However, the belt-force limiter is activated only after an inflating time T_airbag of the air bag has taken place. According to the embodiment described here, the inflating time T_airbag is a predetermined variable which is determined beforehand as an average value by means of tests. According to a preferred embodiment of the present invention, the inflating time of the air bag is to be selected such that it lies in the range of from 40 ms to 70 ms. By way of example, a time of 60 ms has been selected in FIG. 1. (However, it would also be conceivable to measure the actual inflating time, so that the actual inflating time is used in each case.)

In general, the belt-force limiter is to be activated only if a first air-bag stage of the air bag has actually been triggered beforehand.

In the accident sequence illustrated in FIG. 1, the belt-force limiter is to be activated after the predetermined forward displacement of the occupant IVV is reached and after an inflating time T_airbag of the air bag.

According to the preferred embodiment which is shown, the igniting of the first air-bag stage is to serve in each case as the counter start for the two predetermined values which are to be reached. The time runs from this moment until the predetermined forward displacement of the occupant, which is illustrated in FIG. 1, as has already been mentioned, by the arrow T_IVV, is reached. However, in this example which is shown, at the moment at which the predetermined forward displacement of the occupant IVV is reached, the predetermined time for inflating the air bag T_airbag (namely 60 ms from igniting the first air-bag stage) is not yet reached. That means that the belt-force limiter is activated after completion of the inflating time T_airbag for the air bag, which at 60 ms is the longer time here.

Figure 2:
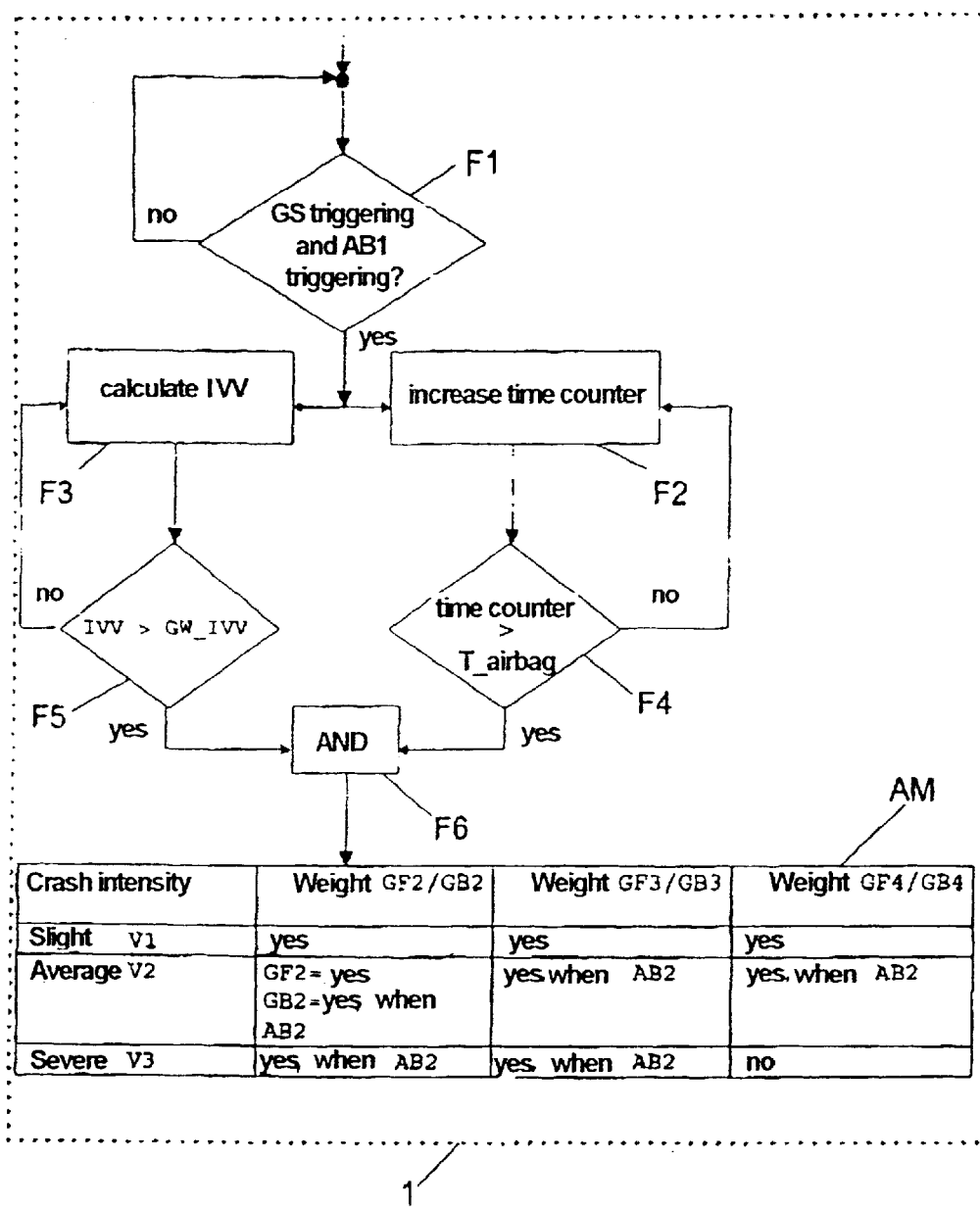
FIG. 2 is a flow chart showing the operation of a preferred embodiment of the occupant-restraining system according to the invention.

FIG. 2 is a flow diagram which shows the operation of a particularly preferred embodiment of the occupant-restraining system according to the invention, in which the belt additionally also has a belt tensioner. The sequence shown there reproduces in simplified form a program module which runs in a triggering control device 1, (indicated symbolically by a dotted line). In this operating sequence, in a first step F1 a test is carried out to determine whether the first air-bag stage AB1 and the belt tensioner GS have both been triggered. If so, with the triggering of the first air-bag stage, the time from which the forward displacement of the occupant T_IVV is determined and the air-bag inflating time T_airbag is calculated, begins in a following processing step F2.

In parallel, in a step F3 the forward displacement of the occupant IVV is determined, for example via measurement of the extension of the belt band. According to the preferred embodiment of the invention shown, the forward displacement of the occupant is, however, determined via a twofold integration of an acceleration signal, as FIG. 1 has also already shown.

After the start of the time counter (step F3), a test is then carried out in a decision step F4 to determine whether the air-bag inflating time T_airbag has been exceeded. This time counting and testing takes place until the inflating time has been exceeded.

At the same time, a test is carried out in a decision step F5 to determine whether the forward displacement of the vehicle occupant has exceeded the predetermined limit value GW_IVV. This testing also takes place until this predetermined threshold value has been exceeded.

Only when both limit values have been recognized as having been exceeded (step F6) is a jump made to what is referred to as an activation matrix AM. The latter is used to take into consideration, in addition, the occupant's weight and the accident severity in the activation of the belt-force limiter. The activation matrix AM contains predetermined, stored values for when the crash intensity is too severe and/or the occupant's weight too great, in which case the belt-force limiter is not activated.

The crash intensity can be determined, for example via the closing velocity (cv) or else via other sensors which may in any case already be present in the vehicle (for example, upfront sensors, deformation sensors or central triggering control device with an integrated acceleration sensor). The weight of the occupant can be determined, for example, via sensors contained in the vehicle seat.

In this exemplary embodiment which is shown of the method according to the invention, the activation matrix AM illustrated in FIG. 2 contains three different crash intensities V1≡slight (≡<30 km/h), V2≡average (≡30–50 km/h) and V≡severe (≡>50 km/h)

Furthermore, three different classes are specified for the occupant's weight. In the activation matrix AM specified in FIG. 2 a further differentiation is also made in each case between the weight of the driver GF2, GF3, GF4 and of the front-seat passenger GB2, GB3, GB4.

GB2 represent an occupant's weight of from 35 kg to 60 kg, GF3 and GB3 for from 60 kg to 90 kg and GF4 and GB4 for an occupant's weight of over 90 kg.

The activation matrix AM specifies when the belt-force limiter is actually activated after the forward displacement of the occupant and the air-bag inflating time have been exceeded, specifically first of all as a function of the crash intensity and the occupant's weight. An activation of the belt-force limiter is indicated in the matrix AM by the notation "yes" and if the activation does not happen, this is denoted in the matrix by "no".

In the case of a minor accident V1, the belt-force limiter will generally be activated, and also in the case of an accident V2 of average severity when the driver belongs to the weight class GF2 of from 35 to 60 kg.

The belt-force limiter is not activated in the case of a severe accident when the occupant's weight belongs to the class GF4/GB4 of over 90 kg.

In the case of an accident V2 of average severity and an occupant's weight GB2, GF3/GB3 and GF4/GB4 and in the case of a severe accident V3 and an occupant's weight GF2/GB2 and GF3/GB3, the belt-force limiter is activated only when a second air-bag stage AB2 has also been triggered.

This has the requirement that air bags having at least two stages are used in which when the occupant has impacted against the air bag cushion, a further igniting takes place and gas is again filled into the air bag.

If an air bag having two stages is not used or if the second air-bag stage is not ignited, the belt force is also not limited.

According to the preferred embodiment which is shown, in the case of a light occupant's weight of GF2/GB2 and an accident V2 of average severity, a differentiation is also made between the driver and the front-seat passenger since, as can be gathered from the activation matrix AM, the belt-force limiter is activated for the driver whereas it is only activated for the front-seat passenger when the second air-bag stage AB2 has also been triggered.

The reason for this is that, according to the preferred embodiment shown, the assumption has been made that the driver is assigned what is referred to as an 80/20 air bag. This means that 80% of the gas volume in the first air-bag stage and only 20% of the gas volume in the second air-bag stage flow into the gas sack, whereas the front-seat passenger is assigned what is referred to as a 50/50 air bag, meaning that 50% of the gas volume in the first and the second air-bag stages flow in each case into the gas sack.

For this reason, at an occupant's weight of F2 and B2 and an accident severity of V2 limitation of the belt force for the driver always takes place, whereas it only takes place for the front-seat passenger when the second air-bag stage has been ignited, since only then can force be sufficiently absorbed by the air bag.

If the belt-force limiter is now activated, the limitation of the belt force can then, for example, take place in a stepwise manner. That is to say, the switch is made from a high value (for example, approximately 4 kN) to a lower value (for example, approximately 2 kN). In addition, however, it is also possible for the limitation of the belt force to take place continuously, approximately in the form of a parabola.

The figures show the thresholds predetermined in accordance with the described, preferred embodiment as limit values. These are the predetermined inflating time for the air bag T_airbag, the predetermined forward displacement of the occupant IVV and the activation matrix AM. These parameters may be stored, for example, in a non-volatile memory which may, however, also be overwritten in order, if appropriate, to change and also add certain parameters. Similarly, the thresholds can, as a departure, be defined as threshold ranges.

Since not all occupants always have an identical weight and since they can also be situated in different positions, it has also proven particularly advantageous if the belt-force limiter is activated separately for each vehicle seat.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. An occupant-restraining system having a belt force limiter which limits a restraining force exerted on an occupant via a restraining belt by switching from a relatively higher to a relatively lower level of restraining force when a belt-force limiter is activated, depending on predefined parameters, wherein the belt-force limiter is activated only after:

a predetermined forward displacement of the occupant is reached;

a predefined air bag inflating time has expired; and crash intensity and an occupant's weight are recognized as being below a predetermined threshold.

2. The method according to claim 1, wherein the inflating time of the air bag lies in the range of from 40 ms to 70 ms.

3. The method according to claim 1, wherein the predetermined forward displacement of the occupant lies in the range of from 250 mm to 450 mm.

4. The method according to claim 1, wherein the predetermined forward displacement of the occupant is determined via an extension of the belt band.

5. The method according to claim 1, wherein the predetermined forward displacement of the occupant is determined via a twofold integration of an acceleration signal.

6. The method according to claim 1, wherein the belt-force limiter is activated only when there has been previous triggering of a first air-bag stage of the air bag.

7. The method according to claim 1, wherein the belt has a belt tensioner.

8. The method according to claim 7, wherein the belt-force limiter is activated only when there has been previous triggering of the belt tensioner.

9. The method according to claim 1, wherein the limitation of the belt force takes place in a stepwise manner.

10. The method according to claim 1, wherein the limitation of the belt force takes place continuously.

11. The method according to claim 1, wherein the belt-force limiter is activated separately for each vehicle seat.

12. A method of operating a seat belt occupant restraint system in a vehicle having inflatable air bag restraint system, said method comprising:

determining forward displacement of a vehicle occupant from a beginning position at a starting time following commencement of an impact of the vehicle;

measuring elapsed time after the starting time; and reducing restraining force exerted by said seat belt restraint system only when, i) a predetermined air bag inflation time has expired;

ii) a predetermined forward displacement of a vehicle occupant is exceeded; and iii) said occupant's weight and crash intensity are below respective predetermined thresholds.

13. The method of operating a seat belt occupant restraint system in a vehicle according to claim 12, wherein:

said air bag restraint system inflates in two stages; and said starting time is a moment at which a first inflation stage occurs.

* * * * *